E. F. MILLER.
STRAW DISTRIBUTER FOR HARVESTER THRESHERS.
APPLICATION FILED OCT. 2, 1920.
1,373,667.
Patented Apr. 5, 1921.
2 SHEETS—SHEET 1.
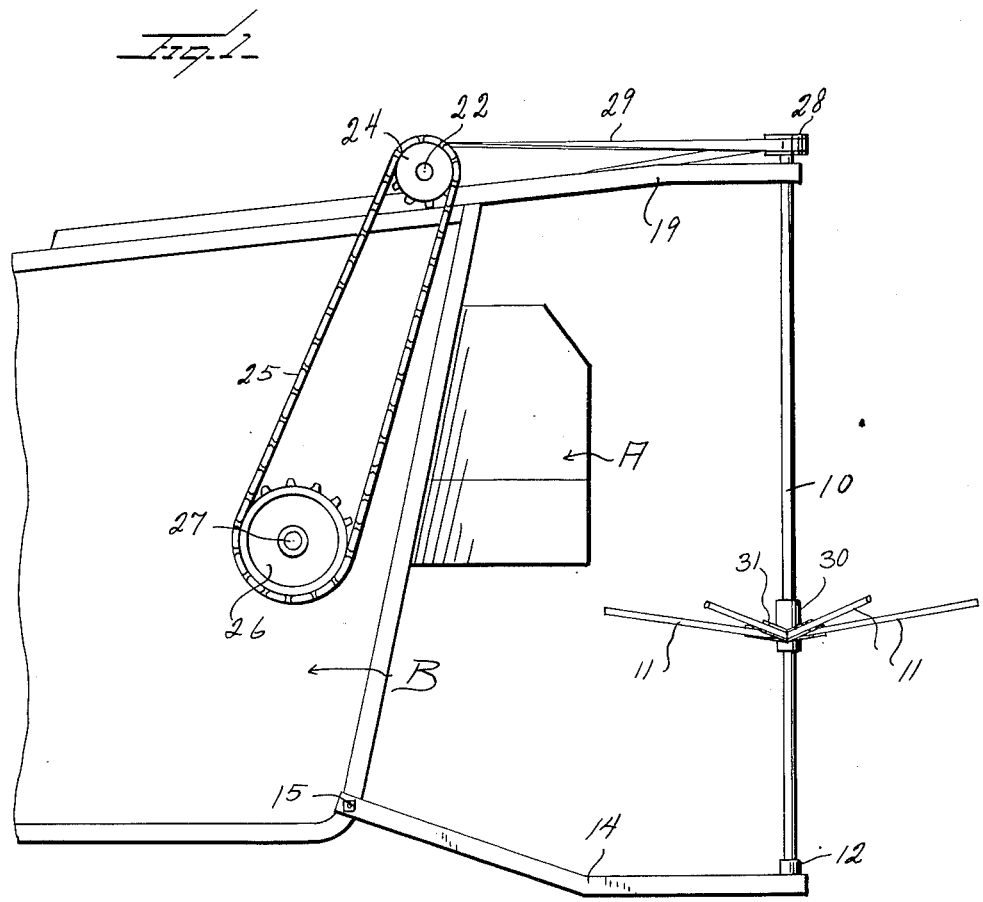
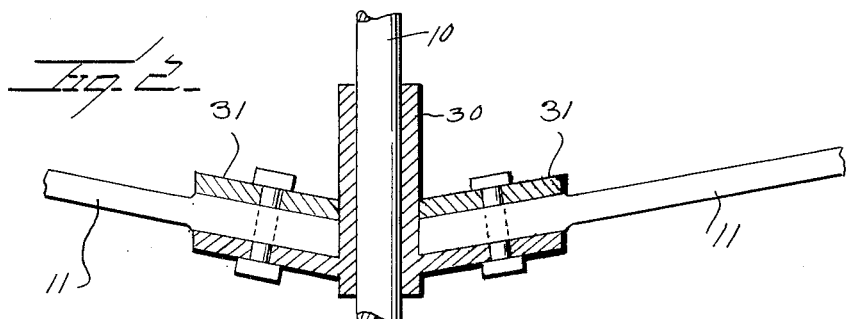
INVENTOR.
E. F. Miller
BY
Watson E. Coleman
ATTORNEY.

E. F. MILLER.
STRAW DISTRIBUTER FOR HARVESTER THRESHERS.
APPLICATION FILED OCT. 2, 1920.
1,373,667.
Patented Apr. 5, 1921.
2 SHEETS—SHEET 2.
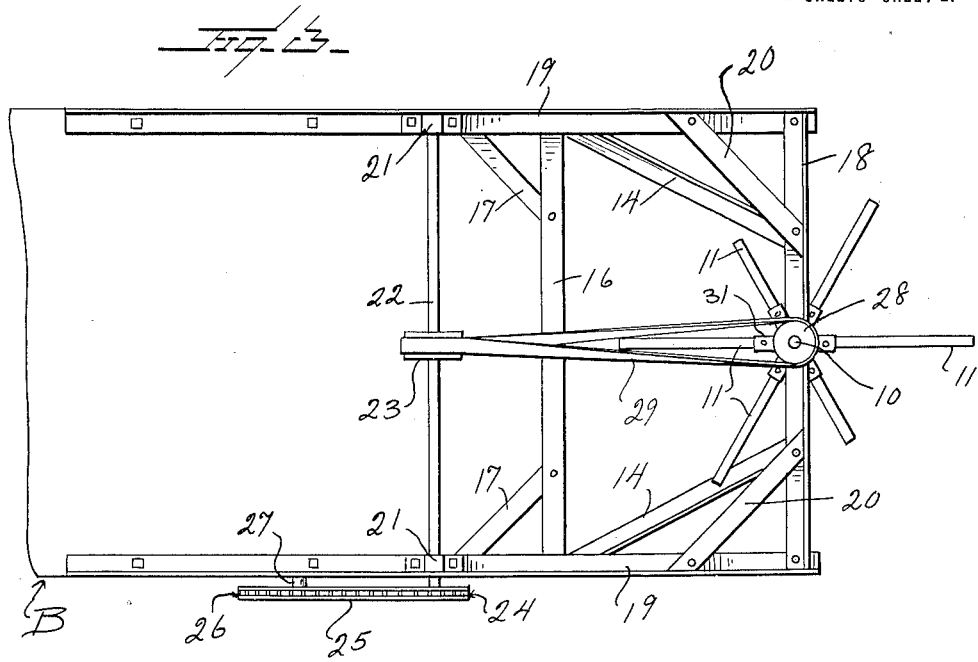
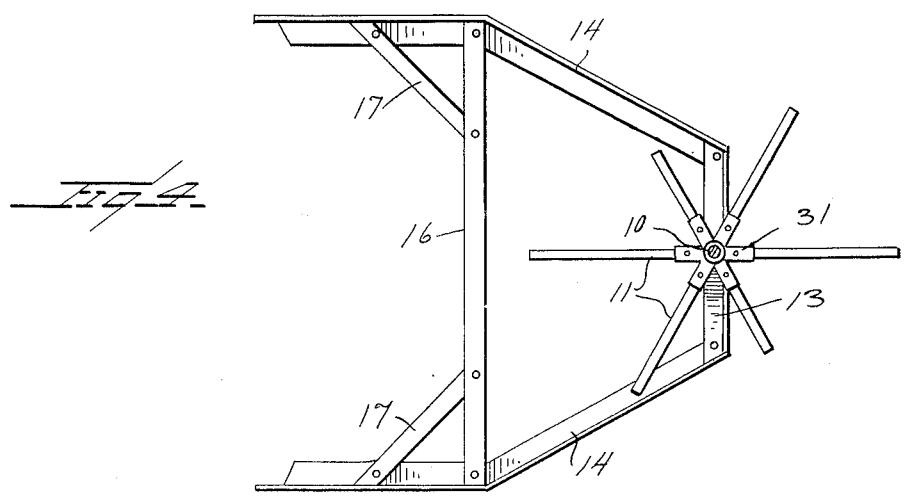
INVENTOR.
E. F. Miller
BY Watson E. Coleman
ATTORNEY.

UNITED STATES PATENT OFFICE.

EDWARD F. MILLER, OF BISON, KANSAS.

STRAW-DISTRIBUTER FOR HARVESTER-THRESHERS.

1,373,667.  Specification of Letters Patent.  Patented Apr. 5, 1921.

Application filed October 2, 1920. Serial No. 414,182.

*To all whom it may concern:*

Be it known that I, EDWARD F. MILLER, a citizen of the United States, residing at Bison, in the county of Rush and State of Kansas, have invented certain new and useful Improvements in Straw-Distributers for Harvester-Threshers, of which the following is a specification, reference being had to the accompanying drawings.

This invention relates to harvester threshers, and particularly to means for distributing the straw evenly over the ground as it is discharged from the harvester thresher.

The general object of my invention is to provide a very simple attachment for harvester threshers which may be applied to different forms of these machines and which will act to distribute the straw any desired distance over the ground as the straw is discharged.

And a further object is to provide a construction of this character having therein a rotatable straw distributer embodying radially disposed blades or arms which, as they rotate, will strike the straw and cast it evenly over the ground at any desired distance.

A further object is to provide a device of this kind which may be readily applied, readily removed, and which is relatively cheap to construct.

Other objects will appear in the course of the following description.

My invention is illustrated in the accompanying drawings, wherein:—

Figure 1 is a side elevation of a harvester-thresher with my distributing device applied thereto;

Fig. 2 is a fragmentary sectional view through the distributing wheel and shaft;

Fig. 3 is a top plan view of the construction shown in Fig. 1; and

Fig. 4 is a top plan view of the lower frame, the shaft 10 being in section.

In these drawings, I have illustrated the rear end of a conventional form of harvester and thresher and wherein the straw is discharged from straw shakers A, these shakers being disposed between the side walls B of the housing over the harvester thresher. My invention has nothing to do with the particular construction of the shakers, nor the particular construction of the harvester thresher.

The distributer or spreader includes a vertically disposed, rotatable shaft 10 having attached thereto a series of radial arms 11, this shaft being supported at its lower end in a bearing 12 mounted upon a cross bar 13, in turn connected to the rear ends of forwardly diverging supporting brackets or braces. These brackets are somewhat angular in form and extend forward and detachably engage, at 15, with the rear ends of the side walls B. These brackets may be attached at one or more points to the side walls as desired, and these brackets or braces 14 are connected by means of a cross brace 16, and the supports 14 are rigidly connected to this brace by means of diagonally disposed reinforcing braces 17. This frame formed by the parts 13, 14, 16 and 17 may be made of angle iron or iron rods.

The upper end of the shaft 10 is supported in a transversely extending member 18, which in turn is attached to longitudinally extending brackets 19 constituting the upper frame. These brackets are preferably made of angle iron and extend longitudinally and are detachably connected, as by means of bolts, at a plurality of points to the top of the side members B. I do not wish to be limited, however, to their attachment to the top of these side members. Diagonal reinforcing braces 20 are bolted or riveted to the longitudinal members 19 and the transverse member 18 so as to hold the members rigidly engaged with each other. Mounted in bearings 21 formed on the members 19 is a transverse shaft 22 carrying at its middle a belt pulley 23, one end of this shaft projecting beyond the adjacent supporting member 19 and carrying a sprocket wheel 24. This sprocket wheel is connected by a sprocket chain 25 with a sprocket wheel 26 mounted upon a shaft 27. This shaft is present in these harvester threshers for the purpose of giving an oscillation or jogging motion to the straw screens. The upper end of the shaft 10 carries upon it a band wheel or pulley 28, and a cross belt 29 operatively engages the pulleys 23 and 28.

Mounted upon the shaft 10 is a hub member 30 having two oppositely disposed plates 31 inclining upwardly toward the outer edges thereof, and between these plates the arms 11 are disposed and rigidly bolted in position inclining upwardly toward the outer ends thereof. These arms 11 may be circular in cross section or have any other desired form, and these arms are radially disposed and spaced at uniform distances from each other, but preferably the arms are arranged in pairs of different lengths so as to throw the straw outward each with a different force, the arms of each pair being diametrically opposed to eliminate vibration.

The operation of this device will be obvious from what has gone before. The straw from the straw shakers A is discharged onto the arms, and as these arms rotate, they will strike the descending straw and cast it outward and spread it evenly over the ground, the upward inclination of the arms permitting them to grip the straw better. If the arms or blades were all of one length, all the straw would be thrown the same distance, but actual practice has shown me that by making the arms of different lengths they will throw the straw struck by the arms different distances so as to get a more even distribution. It will be seen that my attachment is very simple, that it may be applied to practically all forms of harvester threshers, though it has been designed with special reference to the "International" harvesters and threshers, and that the attachment is easily applied and easily removed. Actual practice has shown that the device is thoroughly effective for the purpose intended. Of course, it is obvious that many modifications might be made in the details of construction and arrangement of parts without departing from the spirit of the invention.

I claim:—

1. The combination with a harvester thresher, of means for distributing the straw therefrom comprising a vertically disposed shaft mounted at the discharge end of the harvester thresher and having a series of radially directed separated arms attached thereto and rotating therewith in a horizontal plane and all extending from the shaft on the same plane, and means operatively connected to the driving mechanism of the thresher and for rotating the arms, said arms being of different lengths.

2. A distributer comprising a vertically disposed shaft having a series of radially extending arms separated from each other and disconnected from each other at their outer ends and rotating in a horizontal plane and upon which arms the material to be distributed is discharged, said arms being of different lengths.

3. The combination with a harvester thresher, of a rotatable straw distributer mounted at the rear end thereof and driven from the driving mechanism of the thresher and including a horizontal rotatable member having a series of radially-directed separated blades inclining upwardly toward the outer ends thereof, the blades of said series being arranged in pairs, the blades of each pair being of the same length, and the blades of different pairs being of different lengths, the blades of each pair being diametrically opposed.

In testimony whereof I hereunto affix my signature.

EDWARD F. MILLER.